US012794104B1

(12) United States Patent
McGarrahan et al.

(10) Patent No.: US 12,794,104 B1
(45) Date of Patent: Nov. 10, 2026

(54) AGNOSTIC DIRECTIONAL ANTENNA MOUNT (ADAM)

(71) Applicant: PATHFINDER DIGITAL, LLC, Sanford, FL (US)

(72) Inventors: Roger K. McGarrahan, Orlando, FL (US); Justin R. Bertelsen, Deland, FL (US); Richard H. Strembicki, Winter Springs, FL (US)

( * ) Notice: Subject to any disclaimer, the term of this patent is extended or adjusted under 35 U.S.C. 154(b) by 0 days.

(21) Appl. No.: 19/080,461

(22) Filed: Mar. 14, 2025

Related U.S. Application Data

(60) Provisional application No. 63/565,148, filed on Mar. 14, 2024.

(51) Int. Cl.
*H01Q 3/04* (2006.01)
*H01Q 1/12* (2006.01)
*H01Q 3/08* (2006.01)

(52) U.S. Cl.
CPC .................................... *H01Q 1/125* (2013.01)

(58) Field of Classification Search
CPC ............ H01Q 1/12; H01Q 1/125; H01Q 3/04; H01Q 3/08
See application file for complete search history.

(56) References Cited

U.S. PATENT DOCUMENTS

2017/0047653 A1* 2/2017 Runyon .................. H01Q 3/06

FOREIGN PATENT DOCUMENTS

CA 2657941 A1 * 9/2009 ............... H01Q 3/08
JP H08162833 A * 6/1996 ............... H01Q 3/04

OTHER PUBLICATIONS https://peoc3n.army.mil/Organizations/PM-Tactical-Network/Satellite-Communications/SATCOM-FOT/.
Anglin, John; Walker, Amy; Multiple Paths Lead to Network Resiliency, Army AL&T Magazine, Dec. 9, 2024, https://www.army.mil/article/281863/multiple_paths_lead_to_network_resiliency.
Agmon, Eran; Unlocking the Potential: A Guide to Electronically Steered Antennas, Microwave Journal, Feb. 13, 2024, https://www.microwavejournal.com/articles/41453-unlocking-the-potential-a-guide-to-electronically-steered-antennas.
https://star-mountsystems.com/collections/mounts/products/star-mount-explorer-pro-mount-for-gen-3-starlink-copy.
https://www.walmart.com/ip/Adjustable-Starlink-Mini-Roof-Mount-Pan-Tilt-Lymorexan-Mounting-Kit-Adapter-Magnetic-Mount-Magnet/10113703258.

* cited by examiner

*Primary Examiner* — Hoang V Nguyen
(74) *Attorney, Agent, or Firm* — Lowndes; Stephen C. Thomas

(57) ABSTRACT

A steerable antenna positioner for an antenna that is adapted to mount antennas to moving vehicles, allowing the antenna to maintain antenna pointing towards a satellite which the vehicle is in motion. The positioner/mount enables tilting of an ESA toward a communicating terminal (for example, a satellite communications terminal) such that the ESA beam stays oriented in the direction of the communicating terminal while the vehicle changes its heading, pitch and/or yaw attitude. The antenna mount is agnostic as to the type of antenna, and as to the type of supporting structure (e.g. vehicle). The antenna mount may be used on any vehicle, moving structure or fixed structure. The novel antenna mount achieves antenna positioning without rotating the antenna relative to the mount, thus eliminating the need for RF rotary joints, and eliminating concerns regarding cable over-wrap.

23 Claims, 7 Drawing Sheets

(STOWED POSITION)

AGNOSTIC DIRECTIONAL ANTENNA MOUNT (ADAM)

NONPROVISIONAL PATENT APPLICATION UNDER 35 U.S.C. 111(a) CROSS REFERENCE TO RELATED APPLICATIONS AND INCORPORATION BY REFERENCE

This nonprovisional patent application claims benefit of priority to U.S. Provisional Application No. 63/565,148, entitled AGNOSTIC DIRECTIONAL ANTENNA MOUNT (ADAM), which was filed in the United States Patent and Trademark Office (USPTO) on Mar. 14, 2024, and which is hereby incorporated by reference herein in its entirety.

STATEMENT REGARDING FEDERALLY SPONSORED RESEARCH OR DEVELOPMENT

Not applicable.

FIELD OF THE INVENTION

The present invention is in the field of an antenna mount and positioner for use on a supporting structure, which may be, for example, a moving vehicle. Specifically, the invention is directed to a directional antenna mount for vehicles or other structures which enables orienting of an Electronically Scanned Array (ESA) antenna, or any other antenna or optical system, such as an optical tracker or telescope, toward a communicating terminal or other desired target, such as a target satellite, while simultaneously altering the direction of tilt of the antenna mount so that the ESA beam stays oriented in the direction of the target satellite even while the vehicle changes its heading and/or pitch attitude. The antenna mount is agnostic as to the type of antenna structure, and as to the type of vehicle. The antenna mount may be used on any vehicle, moving structure, stationary structure or fixed structure. While this written description may refer to specific types of antennas as being pointed by the antenna mount, it is to be understood that it is within the scope of the invention that any type of antenna may be pointed by the antenna mount.

BACKGROUND

Flat panel antennas such as Passive Electronically Scanned Array (PESA), Active Electronically Scanned Array (AESA), Hybrid Phased Array, Digital Beam Forming (DBF) Array, and/or Hybrid Beam Forming (HBF) Array antennas (hereinafter collectively referred to as "ESAs") commonly have the ability to acquire and track satellites including geosynchronous satellites (GEO), medium earth orbit satellites (MEO), low earth orbit satellites (LEO), and other non-geosynchronous satellites (NGEO). ESAs also commonly have the ability to operate on-the-move (OTM) enabling them to perform while mounted on moving objects such as aerial vehicle, land vehicles, boats, and trains (collectively referred to herein as "vehicles").

In some use cases, ESAs may be mounted to a supporting structure so that the ESA boresight is roughly towards another communications terminal ("communicating terminal") with which the ESA wishes to communicate. The communicating terminal may be a terminal that is translating, such as a satellite. Further, the structure upon which the ESA is attached may also be translating and, possibly, changing orientation in the yaw and pitch directions. In some use cases ESAs are positioned or mounted so that the ESA is parallel to the ground or mounting platform with the initial boresight of the ESA in full zenith. The ESAs then electronically direct their beam towards the communicating terminal, which may be a target satellite, for operation. However, the efficiency of ESAs drops dramatically when the angle of the beam must go below 10 degrees (close to the horizon) in order to point at the target satellite. The resulting drop in efficiency threatens the effective operation of the ESA and significantly reduces the achievable transmission data rate. The effect of losses in antenna gain due to the ESA beam becoming off-boresight to the communicating terminal caused by translation of the communicating terminal and/or the ESA, and any changes in yaw or pitch of the ESA, can be compensated to some extent by electronically steering the ESA beam.

Historically, antenna positioners have utilized a rotating/spinning supporting structure to achieve a desired antenna beam orientation. For example, some positioners utilize an "elevation over azimuth" approach, which changes the elevation angle of the antenna, and rotates the supporting structure, to achieve a desired antenna beam pointing orientation. However, rotation of the supporting structure causes a twisting of the RF and other electrical cabling connecting the antenna to other electronics, such as downconverters, receivers, and the like. Some of this cabling may be delicate in nature, especially the RF signal cabling, which may be coaxial cabling. This rotation of the supporting structure may require that the use of RF rotary joints, which in turn may cause degradation of the RF signal on the coax due to discontinuities in the impedance in the signal path through the rotary joint. It would be desirable to achieve the ability to orient the antenna beam without the need for any RF or other rotary joints, cabling looping, or other commonly used techniques for accommodating a spinning antenna support structure. Further, there is a real risk of damaging the RF cabling in the case in which a mere cable loop is used to accommodate a rotating structure, as the antenna operator may over-rotate the structure, causing strain and damage to the coax. To prevent such damages, limit switches may be utilized to prevent over-rotation of the supporting structure, but this introduces additional electrical components and circuitry into the antenna positioning system, all of which are subject to eventual failure.

Therefore, what is needed in the art is an antenna mount that orients the ESA beam toward the communicating terminal, which may be a target satellite, so that the ESA beam is oriented in the direction of the communicating terminal even while the vehicle upon which the ESA is attached translates, and changes yaw and/or pitch attitude. By continually compensating for translation, yaw and pitch of the ESA supporting structure, less beam steering of the ESA is required in order to communicate effectively with the communicating terminal. An ability to compensate for yaw and pitch of the ESA supporting structure in the range of 10 to 30 degrees off boresight, or even greater ranges ranging from angles of less than 10 degrees to greater than 30 degrees, is needed.

BRIEF SUMMARY OF THE INVENTION

An object of the present invention is to provide a vehicle mount that orients an ESA beam towards a communicating terminal, which may be but is not necessarily a target satellite, continuously while the ESA supporting structure changes yaw and/or pitch attitude. In embodiments, the ESA supporting structure may be a vehicle.

An exemplary embodiment of the invention includes an ESA mounting platform comprising an outer ring and an inner rotatable ring, wherein the outer ring is fixedly attachable to a supporting structure (which may be, for example, a structure that is attached to a vehicle) and wherein the inner rotatable ring is adapted to be rotated relative to the outer ring on a rotating engagement; a carriage fixedly attached to the inner rotatable ring, wherein the carriage comprises a pivotable car attached to a tilting platform; the tilting platform centered on a support system, the tilting platform slidably engaged with the pivotable car and carriage, wherein the support system is fixedly attachable to said mounting plate, and the tilting platform is attachable to the carriage by the pivotable car and the one or more pins or other attachment means as is known in the art; and a motor and one or more gears for rotating the inner rotatable ring in relation to the outer ring. The invention may further comprise a motor power supply, an antenna control unit interface, and electrical cabling for electrically connecting the antenna control unit interface to the motor.

In embodiments, the invention may comprise a stow pad attached to the inner circular ring for supporting the ESA when the ESA in a stowed position.

In embodiments, the inner ring may rotate relative to the outer ring at rotational speed rate sufficient to accommodate the turning rate of the vehicle upon which the mount is installed.

It is a significant advantage of the present invention that the ESA, when mounted on the tilting antenna platform, is able to tilt relative to the supporting structure, but is not required to spin in order to achieve a desired antenna beam orientation. This operation allows the ESA beam to be oriented at an angle to the supporting structure as desired, without requiring the antenna coax and other electrical cabling to spin about the ESA beam axis, thereby eliminating the aforementioned problems with spinning antenna positioners.

The present invention is designed to accommodate any ESA by altering its size, component strength, operational ratings, gearing ratios, antenna mounting positions, vehicle/structure mounting positions, dampeners/isolators, degree of tilt, angular rate of rotation, etc., as needed for each specific application.

In addition to the track system depicted in the exemplary embodiment shown in the drawings, a variety of techniques may be used to tilt the tilting platform such that the ESA beam is directed toward the communicating terminal, including the use of rollers (wheels) rotatably attached to either the inner ring or outer ring, the rollers traveling along a receiving track in either the outer or inner ring, respectively, a series of magnetic contacts, and rods which pull/push the tilting antenna platform.

Any or all of the features and elements of the invention described herein, and depicted in the drawings, may be present in any of the embodiments, in any number or combination. It is not necessary that any particular embodiments comprise all of the features of the invention described herein, and depicted in the drawings.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating exemplary embodiments of the invention and are not to be construed as limiting the invention. In the drawings.

DETAILED DESCRIPTION OF THE INVENTION

Figure 1:
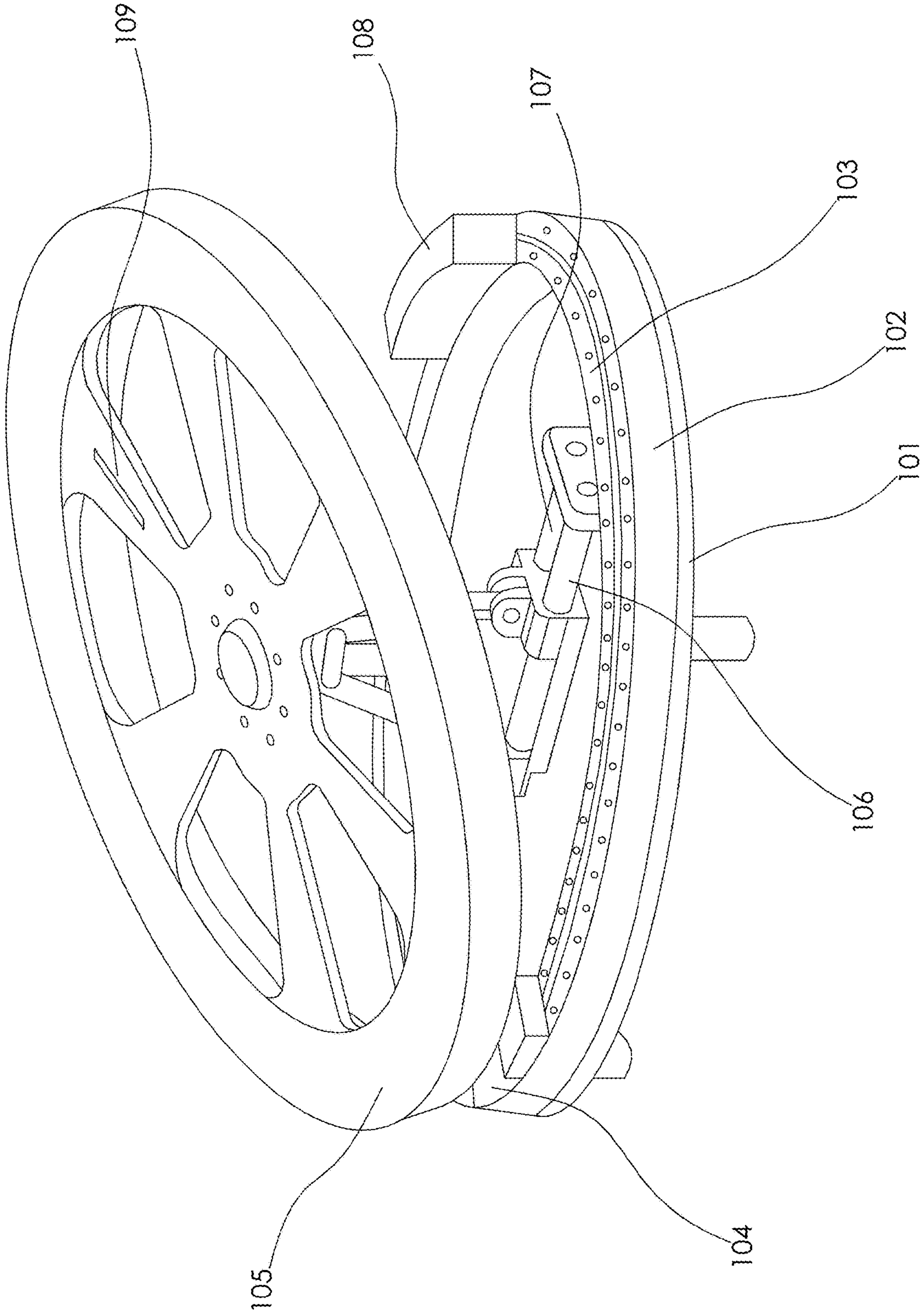
FIG. 1 depicts a perspective view of an exemplary embodiment of the agnostic directional antenna mount system of the invention.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings. Accordingly, the following detailed description is not limited to the disclosed embodiments and examples. Instead, the proper scope is defined by the appended claims. In the drawings, like callouts refer to like features.

Referring to FIGS. 1-7, an exemplary embodiment of the present invention is shown. The antenna vehicle mount system may comprise a mounting plate 101 for attaching the system to a supporting structure such as, but not limited to, a vehicle, a moving structure, a stationary structure or fixed structure. In the embodiment shown in FIG. 1, the mounting plate 101 is circular in shape, but in other embodiments mounting plate 101 may be any desired shape. In embodiments, mounting plate 101 may comprise a portion of the supporting structure, or, likewise, the supporting structure itself may form all or a portion of mounting plate 101. Thus, the depicted shape of mounting plate 101 is not meant to be limiting. In some embodiments, mounting plate 101 may be oval, square, rectangular, or any other polygonal shape depending on the specific application. The mounting plate 101 may be attachable to a supporting structure using screws, bolts, clamps, quick-connects, quick-disconnects or any permanent or removable attachment known in the art.

The system of the present invention also comprises a mounting platform comprising two concentric rings—an outer stationary ring 102 and an inner rotatable ring 103. The inner rotatable ring 103 may have an outer diameter slightly smaller than the inner diameter of the outer stationary ring 102 in order to accommodate a rotatable attachment between inner rotatable ring 103 and outer stationary ring 102. The outer stationary ring 102 may be a protective ring which functions to physically protect the inner rotatable ring 103, and also may house the bearing and gears for enabling the rotation of the inner rotatable ring 103 in relation to outer stationary ring 102. The inner rotatable ring 103 may be rotated using a first controllable motor (not shown) and one or more gears that, in combination, form a controllable motor-gear drive that is attached to a carriage 104, further described below. The motor-gear drive gear(s) may be engaged with a receiving gear structure, such as a ring gear, in a gear-to-gear attachment such that, when the gear(s) comprising the motor-gear drive are rotated by the controllable motor, the inner rotatable ring 103 is rotated in relation to outer stationary ring 102. The motor-gear drive is capable of rotating the inner rotatable ring 103 at any desired rotational speed, but, in embodiments, the motor-gear drive and inner rotatable ring 103 are operable and adapted to rotate the inner rotatable ring 103 relative to outer stationary ring 102 as depicted by arrow A in FIG. 5 at a rate sufficient to accommodate the turning rate of a moving structure (e.g. a vehicle) upon which the mount is installed, which may be any turning rate. Control of the rotation of the inner rotatable ring 103 may be controlled by a processor in electrical communication with the first controllable motor. The processor may be integrated with an antenna control unit. The processor may comprise, or be in communication with, a non-transitory computer readable medium for storing non-transitory computer readable and executable instructions, that, when read and executed by the processor, are usable for receiving user commands to command the first controllable motor to rotate inner rotatable ring 103, and commanding inner rotatable ring 103 to rotate, as described herein. The processor may also be in communication with the second controllable motor for control of the tilt of the tilting platform 105 as described below. The processor may be in wired or wireless communication with external user input/output devices for communicating commands to the processor, such as, for example, and not by way of limitation, switches, touchscreens, keyboards and/or keypads, video or other electronic displays, or other user input/output devices, for receiving user commands and displaying status or other information to a user. The processor may be in wired or wireless communication with other networks, processors or controllers for the same reasons.

Mounted to the inner rotatable ring 103 is a carriage 104. In FIG. 1, the carriage 104 is shown at approximately the 9 o'clock position. The carriage 104 is fixedly attached to, and moves with, the inner rotatable ring 103 as it rotates (i.e. spins) clockwise/counter-clockwise relative to outer stationary ring 102. The carriage comprises one or more pins (not shown) and a pivotable car (not shown in FIG. 1). The one or more pins are positioned substantially vertical and the bottom ends of the pins are nested in a receiving portion of the carriage 104 body. The upper ends of the pins sit in a track (not shown) located on the underside of a tilting platform 105. Also shown, a stow pad 108 positioned at the opposite side of the "clock face" from the carriage 104 for the tilting platform 105 to rest on when the system is in a stowed position.

Figure 2:
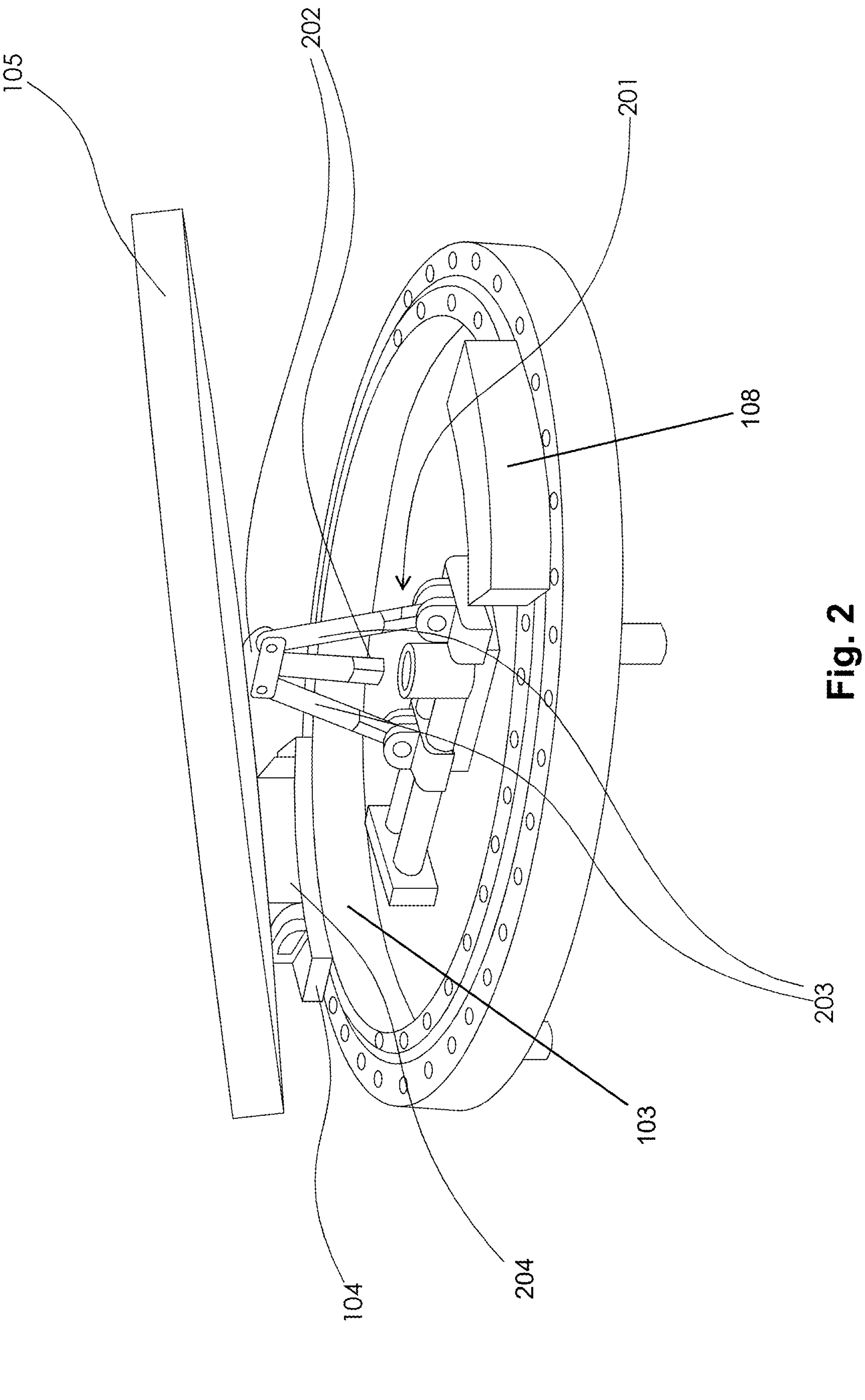
FIG. 2 depicts another perspective view of an exemplary embodiment of the agnostic directional antenna mount system of the invention.
Figure 5:
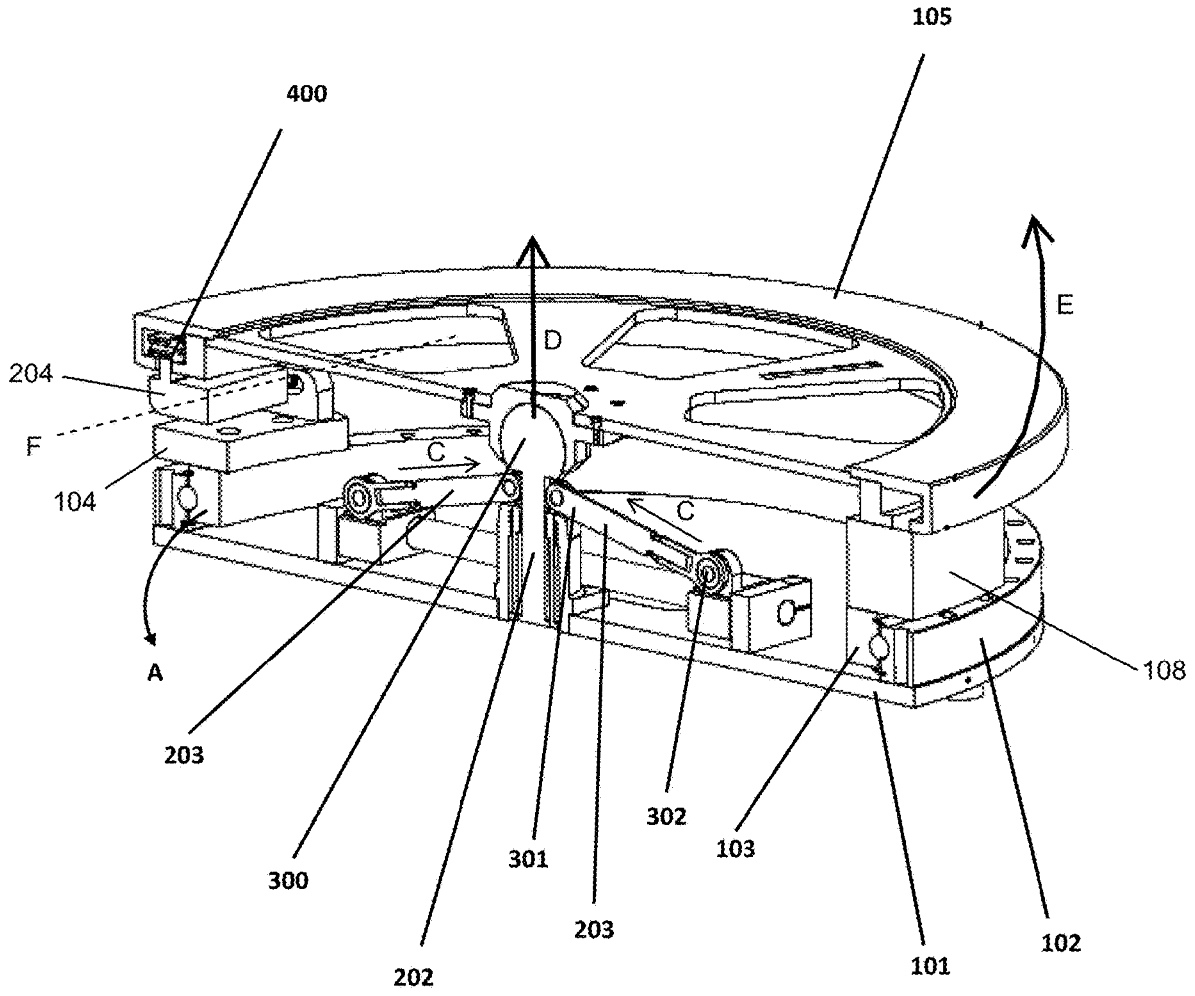
FIG. 5 depicts a cross section perspective view of an exemplary embodiment of the agnostic directional antenna mount system of the invention in the stowed position.

Referring to FIGS. 1, 2 & 5, a support system which may comprise one or more screws (for example but not limited to ball screws) 106 and one or more guide rods 107, and one or more elevating rods 203 for changing the angle/pitch of the tilting platform 105. In embodiments, tilting platform 105 may be "skeletonized" to reduce the weight of the tilting platform 105 while still providing structural integrity for mounting an ESA to tilting platform 105. Skeletonization is a structural optimization technique that involves selectively removing material from a component or structure to reduce weight while maintaining necessary mechanical strength, stiffness, and functional integrity. The screws 106 are connected to elevating rods 203 (hidden from view) for adjusting the angle of the tilting platform. When the screws 106 are rotated so as to move the elevating rods 203 towards the center of the mounting plate 101, the pitch (i.e. angle) of the tilting platform increases as the proximal ends 302 of elevating rods 203 are caused to be translated towards the center of the mounting plate 101. If the screws 106 are rotated so as to translate the proximal ends of elevating rods 203 towards the perimeter of the mounting plate 101, the angle of the tilting platform 105 decreases. Thus, the rotation of screws 106, which may be effectuated by a second controllable motor attached to screws 106, is controllable by the processor and operable to enable the tilt angle of the tilting platform 105 to be adjusted to a desired angle for pointing the ESA beam. Also shown in FIG. 1, is an indicator 109 which will help further explain the operation of the system with reference to FIG. 3 below.

Referring to FIG. 2, the inner rotatable ring 103, along with the fixedly attached carriage 104 and stow pad 108, is depicted as rotated from position shown in FIG. 1 so that the carriage 104 is approximately in the 12 o'clock position. In this view, the support system 201 for the tilting platform 105 is shown. The support system 201 may comprise a "ball hitch" or semi-spherically shaped ball-and-socket style attachment 300 (see FIG. 5) via ball pin 202 and a mounting bracket (not shown). The mounting bracket comprises a socket that envelopes and receives the ball portion of the ball pin 202. The ball portion of the ball pin may have a chamber running horizontally through the ball which enables the mounting bracket (and connected tilting platform 105) to change direction as the inner rotatable ring 103 rotates. The mounting bracket may be secured to the ball pin 202 utilizing a pin running horizontally through the ball portion of the ball pin 202. The mounting bracket is centered in the middle of the tilting platform 105. The mounting bracket and ball pin 202 enables the tilting platform 105 to freely rotate around the ball portion of the ball pin 202 in any direction. The angle of the tilting platform 105 may be from zenith (i.e. 0 degrees/horizontal) up to 30 degrees in embodiments, but this is not intended as a limitation, as, in embodiments, any range of tilt may be achieved by the invention.

The support system 201 may further comprise two elevating rods 203 attached on their distal ends 301 to the ball pin 202, just below the ball portion of the ball pin 202. The two elevating rods 203 may each be attached to a respective screw 106 and guiding rod 107. As mentioned above, the screw(s) 106 are driven by one or more second controllable motors (not shown) which may be in electrical communication with the processor, so that the processor can control the speed and direction of rotation of screw(s) 106, thus adjusting the tilt, or angle, of the tilting platform 105.

Operation of the support system 201 will now be described. As the second controllable motor drives the screw 106 while the mount is in the stow position, the elevating rods 203 are driven inward and upward which accordingly drives the ball pin 202 up. As the second controllable motor drives the screw 106 in the opposite direction while the mount is in the deployed position, the proximal ends of elevating rods 203 are driven outward, which, in turn motivates the ball pin 202 downwards back towards the stow position. The stow position is a position in which the tilting platform 105 is rotated towards mounting plate 101 so as to be substantially parallel with mounting plate 101, and wherein pad 108 prevents further rotation of tilting platform 105 towards mounting plate 101.

Also shown in FIGS. 1-7 is a pivotable car 204 that is either a part of, or is attached to, the carriage 104. The pivotable car 204 is able to pivot within the carriage 104 to accommodate any changes in the angle of the substantially vertical pins (not shown). It is important to note here that although the inner rotatable ring 103 has been rotated from the view shown in FIG. 1, the tilting platform 105 has not rotated. Instead, a sliding attachment 400 (shown in FIG. 5) between the pivotable car 204 and an underneath surface of the tilting platform 105, which may comprise a track running around the underside of the tilting platform 105, operate to pull the tilting platform down at the point of sliding attachment as inner ring 103 rotates relative to outer stationary ring 105 as the carriage 104 (along with pivotable car 204) rotates with the inner rotatable ring 103.

Figure 3:
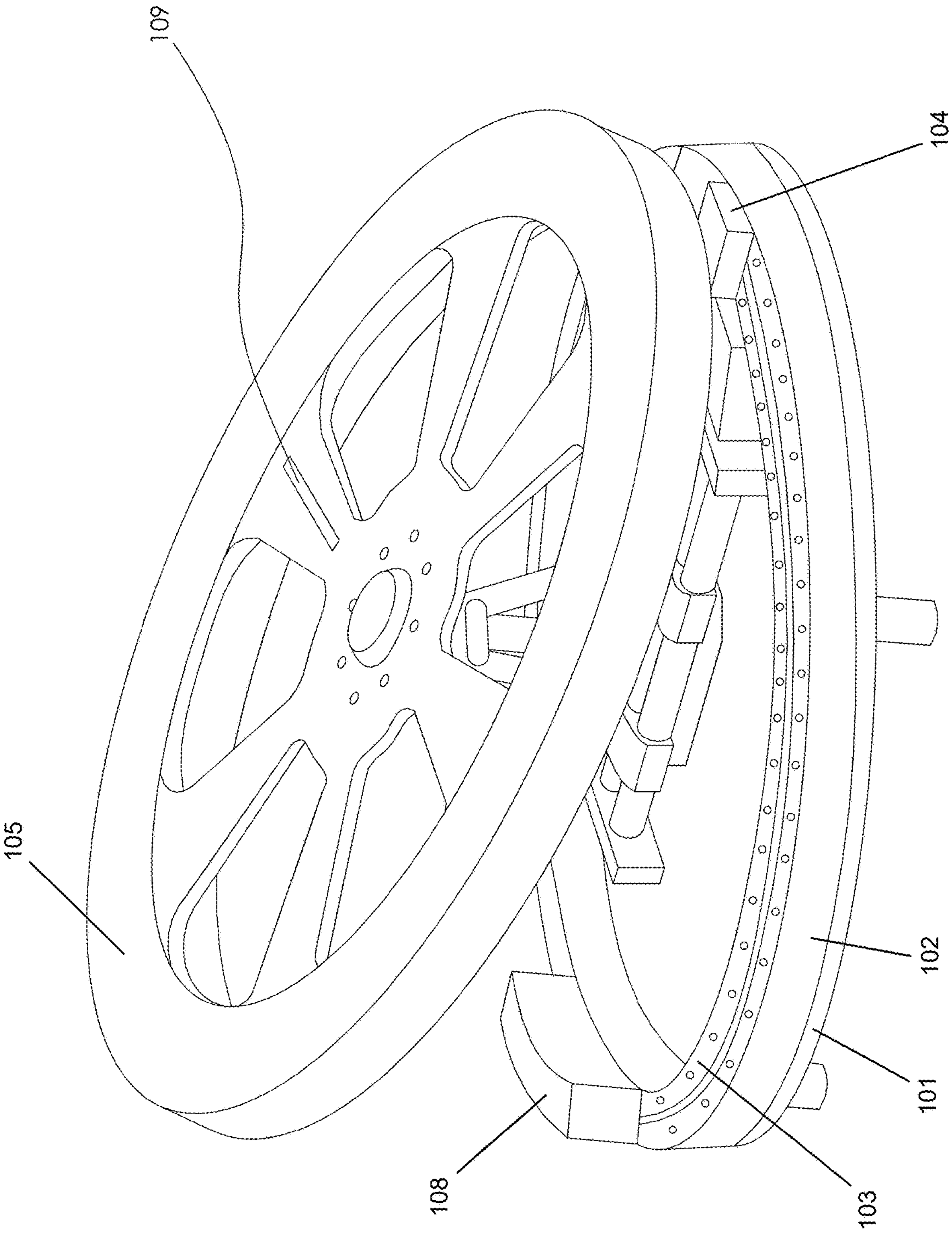
FIG. 3 depicts yet another perspective view of an exemplary embodiment of the agnostic directional antenna mount system of the invention.

Referring now to FIG. 3, the inner rotatable ring 103 (and connected components described above) are in a different position (i.e. different location on the "clock face"). As can be seen in FIG. 3, the inner rotatable ring 103 has rotated from the position shown in FIG. 2 bringing carriage 104 to approximately the 4 o'clock position. It should be noted that the indicator 109 on the tilting platform 105 has not moved from it's original "clock" position. Instead, the 4 o'clock portion of the tilting platform has been lowered because the pins (not shown) of the carriage 104 have ridden inside the track running around the underside of the tilting platform 105, causing tilting platform 105 to change the direction of tilt.

Figure 4:
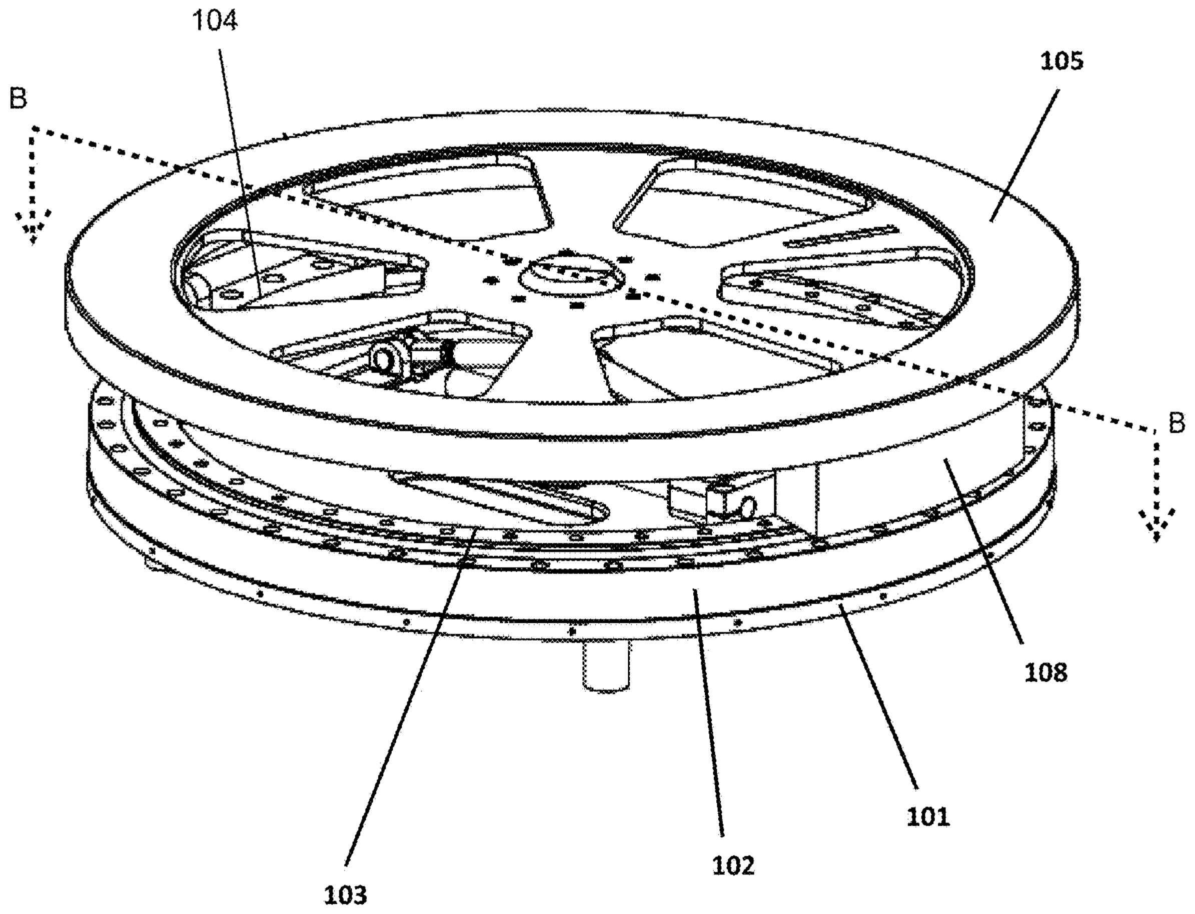
FIG. 4 depicts a perspective view of an exemplary embodiment of the agnostic directional antenna mount system of the invention in the stowed position.

Referring now to FIG. 4, a perspective view of an embodiment of the invention is illustrated in a stowed configuration. In this configuration, tilting platform 105 is resting on stow pad 108 thereby limiting/preventing load from being exerted on support system 201.

Referring now to FIG. 5, a cross-sectional view taken along plane B in FIG. 4 is illustrated to help with understanding operation of the invention. As the second controllable motor drives the screw 106 while the mount is in the stow position, the elevating rods 203 are driven inward and upward in direction shown by arrow C which accordingly drives the ball pin 202 up in direction shown by arrow D. This causes the portion of titling platform 105 resting on stow pad 108 to tilt up and away from stow pad 108 in direction shown by arrow E. As tilting platform 105 is titled up in direction E, pivotable car 204 is caused to rotate/pivot along longitudinal axis F to accommodate the changing the angle of tilting platform 105.

Figure 6:
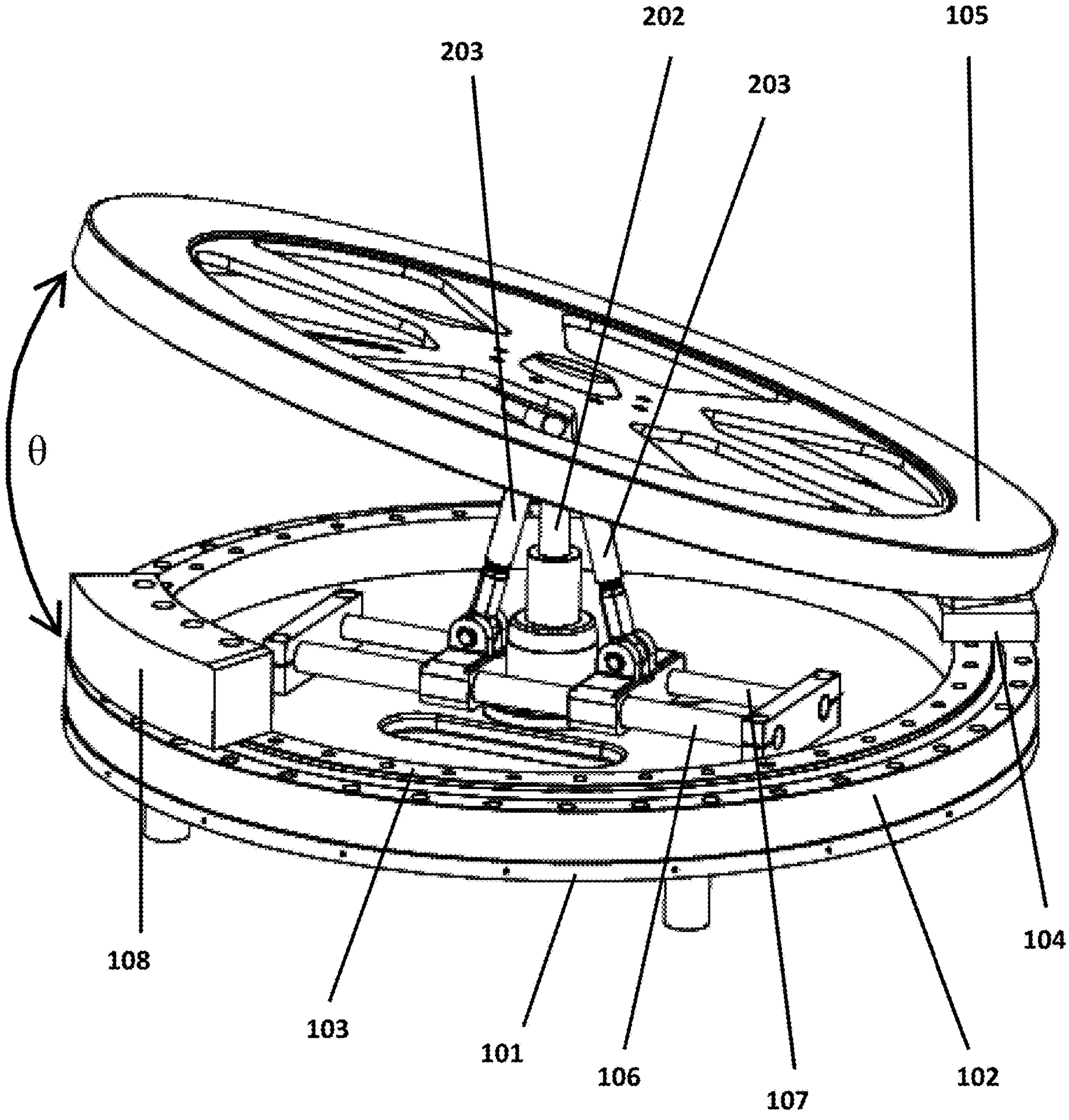
FIG. 6 depicts a perspective view of an exemplary embodiment of the agnostic directional antenna mount system of the invention.

Referring now to FIG. 6, a perspective view of the invention is illustrated. The tilting platform in a position having an angle of tilt θ. In an exemplary embodiment, the angle of tilt θ may be from zenith (i.e. 0 degrees/horizontal) up to 30 degrees, but this is not intended as a limitation. In embodiments, any range of tilt θ from zero degrees up to ninety degrees (i.e. vertical) may be achieved by the invention.

Figure 7:
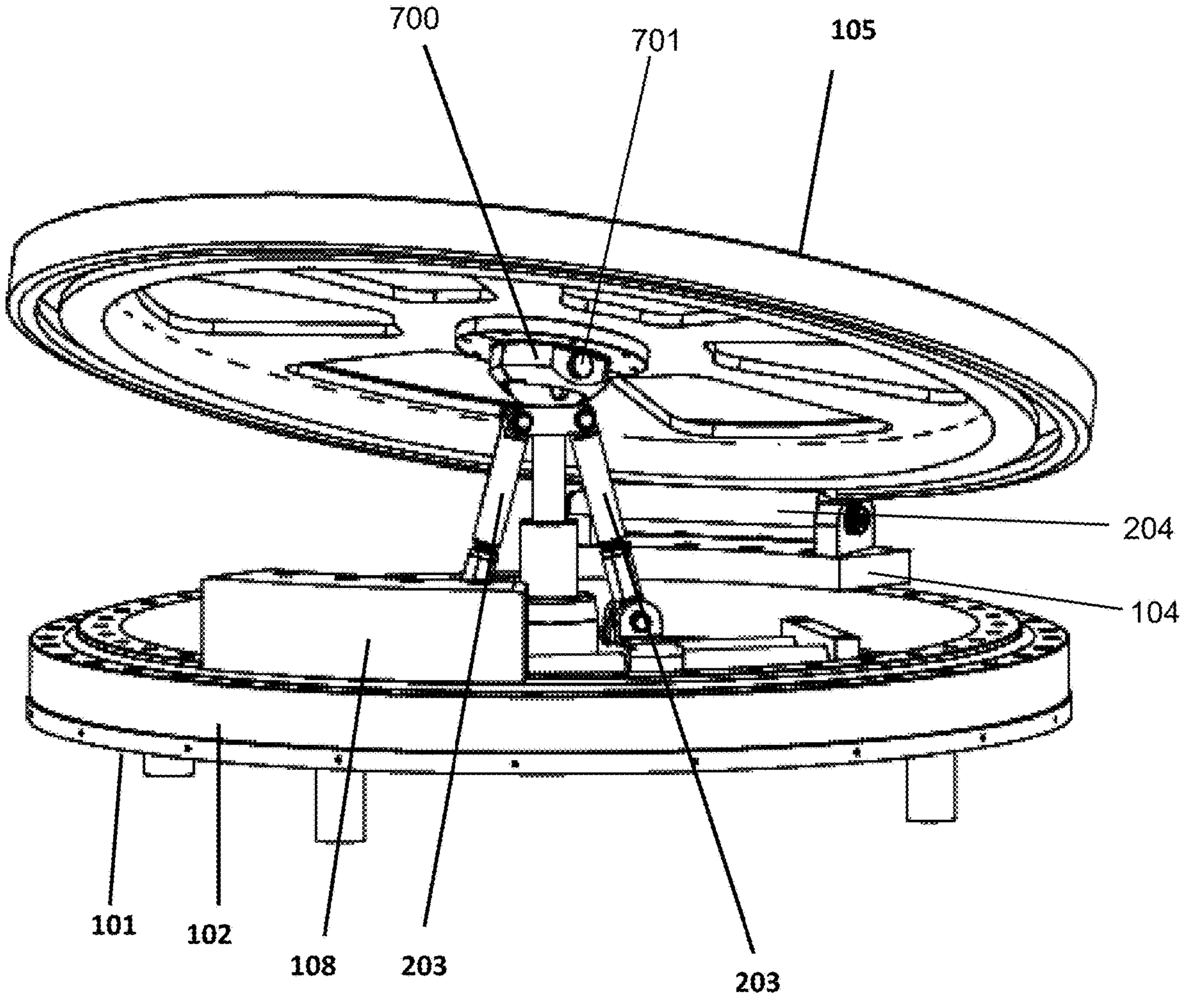
FIG. 7 depicts a perspective view of an exemplary embodiment of the agnostic directional antenna mount system of the invention, providing a view of an exemplary ball-and-socket spherically rotatable attachment of the tilting platform 105.

Referring now to FIG. 7, another perspective view of the invention is illustrated. The support system 201 may comprise a "ball hitch" or semi-spherically shaped ball-and-socket style attachment 700 and a mounting bracket. The mounting bracket comprises a socket that envelopes and receives the ball portion 300 of the ball pin 202. The ball portion 300 of the ball pin 202 may have a chamber running horizontally through the ball portion 300 which enables the ball-and-socket style attachment 700 to connect to the mounting bracket (and connected tilting platform 105) and change tilt direction as the inner rotatable ring 103 rotates. The mounting bracket may be secured to the ball pin 202 utilizing a pin 701 running horizontally through the ball portion 300 of the ball pin 202. The mounting bracket is centered in the middle of the tilting platform 105. The mounting bracket and ball pin 202 enables the tilting platform 105 to freely rotate around the ball portion of the ball pin 202 in any direction. The angle of the tilting platform 105 may be from zenith (i.e. 0 degrees/horizontal) up to 30 degrees in embodiments, but this is not intended as a limitation, as, in embodiments, any range of tilt angle may be achieved by the invention.

All moving parts of the system may be lubricated and isolators or other mounts may be used to minimize vibration and damage from impacts or movement of a vehicle. Furthermore, a power supply may power the system which will also meet environmental standards and/or mechanical safety standards.

While the specific application described herein is described, in embodiments, as being useful ESAs mounted on a vehicle, this is but one non-limiting application of the system. The system may be used in any application or system that would benefit from directional targeting.

It is a significant advantage of the present invention that any apparatus, when mounted on the tilting platform, is made only to tilt, but not to spin, as any electrical cabling to a mounted apparatus would otherwise become twisted as the vehicle changes direction.

Although these several embodiments have been illustrated, numerous other changes, substitutions, variations, omissions, alterations, and/or modifications are possible without departing from the scope of the present invention, as defined by the appended claims. The particular embodiments described herein are illustrative only. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Similarly, methods associated with disclosed embodiments may be implemented using more, less, and/or other steps than those described herein, and their steps may be performed in any suitable order.

While particular embodiments have been shown and described, it will be apparent to those skilled in the art that numerous variations, additions, omissions, and other modifications will be apparent to one of ordinary skill in the art. It will be appreciated that the systems and methods described above are set forth by way of example and not of limitation.

What is claimed is:

1. An antenna mount system, the system comprising:

a mounting plate for mounting the mount system to a supporting structure;

a mounting platform comprising an outer ring and an inner rotatable ring, wherein said outer ring is fixedly attached to said mounting plate, and wherein said inner ring is rotatably attached to said outer ring;

a carriage fixedly attached to said inner rotatable ring, wherein said carriage comprises a pivotable car and one or more pins, said pivotable car slidably engaged with a tilting platform;

said tilting platform in a rotatable engagement with a support system, wherein said support system is fixedly attachable to said mounting plate, and wherein said tilting platform is adapted to adjust a tilt angle between the tilting platform and the mounting plate;

a first controllable motor and one or more gears for driving the motion of said inner rotatable ring such that the inner ring rotates in relation to the outer ring;

a power supply;

an antenna control unit interface; and electrical cabling for connecting said antenna control unit interface to said motor and gears.

2. The system of claim 1, further comprising a stow pad attached to the inner rotatable ring opposite of the carriage for the tilting platform to rest upon when in a stowed position.

3. The system of claim 1, wherein the tilting platform comprises a track running around the underside perimeter of the tilting platform; and wherein said tilting platform is slidably attached to said pivotable car through mating of the one or more pins to the track.

4. The system of claim 3, wherein the support system comprises a ball pin having a chamber running horizontally through the ball, wherein the support system further comprises a mounting bracket attached to the tilting platform and having a socket that envelopes the ball in spherically rotatable ball-and-socket attachment.

5. The system of claim 4, wherein the support system further comprises two rods rotably attached on their distal ends to the ball pin just below the ball portion, and wherein the proximal ends of the two rods are rotatably attached to a bracket that is in a threaded engagement with at least one screw, the screw being rotatable by a second controllable motor such that rotation of the screw by the second controllable motor causes the proximal ends of the two rods to be translated towards, or away from, the inner rotatable ring, thereby adjusting the tilt of the tilting platform.

6. The system of claim 5, further comprising a guide rod running parallel to the screw for preventing binding of the screw as it is rotated by the second controllable motor.

7. The system of claim 5, wherein said system further comprises a processor for controlling the first controllable motor and said second controllable motor.

8. The system of claim 1, wherein said tilting platform is adapted to accept an antenna.

9. The system of claim 8, where said antenna is an ESA.

10. The system of claim 1, wherein a speed of rotation of the inner ring relative to the outer ring is sufficient to accommodate the turning rate of the vehicle upon which the mount is installed.

11. The system of claim 1, wherein said system further comprises a processor for controlling the first controllable motor.

12. The system of claim 1, wherein the angle of tilt of the tilting platform to the mounting plate is in a range of 0 degrees to 30 degrees.

13. A method for providing antenna steering, comprising:

providing a system adapted to adjust a tilt angle of an antenna attached to an apparatus without causing the antenna to rotate relative to the apparatus, said apparatus comprising:

a mounting plate for mounting the vehicle mount system to a supporting structure;

a mounting platform comprising an outer ring and an inner rotatable ring, wherein said outer ring is fixedly attached to said mounting plate, and wherein said inner ring is rotatably attached to said outer ring;

a carriage fixedly attached to said inner rotatable ring, wherein said carriage comprises a pivotable car and one or more pins, said pivotable car slidably engaged with a tilting platform;

said tilting platform in a rotatable engagement with a support system, wherein said support system is fixedly attachable to said mounting plate, and wherein said tilting platform is adapted to adjust the tilt angle between the tilting platform and the mounting plate;

a first controllable motor and one or more gears for driving the motion of said inner rotatable ring such that the inner ring rotates in relation to the outer ring;

a power supply;

an antenna control unit interface; and electrical cabling for connecting said antenna control unit interface to said motor and gears;

proving an antenna having a beam;

attaching said antenna to said tilting platform; and controlling said first controllable motor and said tilting platform such that said antenna beam is oriented in a desired direction.

14. The method of claim 13, wherein said system further comprises a stow pad attached to the inner rotatable ring opposite of the carriage for the tilting platform to rest upon when in a stowed position.

15. The method of claim 13, wherein the tilting platform comprises a circular track running around the underside of the tilting platform; and wherein said tilting platform is attached to said carriage through mating of the one or more pins to the track.

16. The method of claim 15, wherein the support system comprises a ball pin having a chamber running horizontally through the ball, wherein the support system further comprises a mounting bracket attached to the tilting platform and having a socket that envelopes the ball in spherically rotatable ball-and-socket attachment.

17. The method of claim 16, wherein the support system further comprises two rods rotably attached on their distal ends to the ball pin just below the ball, and wherein the proximal ends of the two rods are rotatably attached to a bracket that is in a threaded engagement with at least one ball screw, the ball screw being rotatable by a second controllable motor such that rotation of the ball screw by the second controllable motor causes the proximal ends of the two rods to be translated towards, or away from, the inner rotatable ring, thereby adjusting the tilt of the tilting platform.

18. The method of claim 17, wherein said system further comprises a guide rod running parallel to the ball screw for preventing binding of the ball screw as it is rotated by the second controllable motor.

19. The method of claim 17, wherein said system further comprises a processor for controlling the first controllable motor and said second controllable motor.

20. The method of claim 13, where said antenna is an ESA.

21. The method of claim 13, wherein a speed of rotation of the inner ring relative to the outer ring is sufficient to accommodate the turning rate of the vehicle upon which the mount is installed.

22. The method of claim 13, wherein said system further comprises a processor for controlling the first controllable motor.

23. The method of claim 13, wherein the angle of tilt of the tilting platform to the mounting plate is in a range of 0 degrees to 30 degrees.

* * * * *